(12) United States Patent
Stephens et al.

(10) Patent No.: US 11,247,130 B2
(45) Date of Patent: Feb. 15, 2022

(54) INTERACTIVE OBJECTS IN STREAMING MEDIA AND MARKETPLACE LEDGERS

(71) Applicant: SONY INTERACTIVE ENTERTAINMENT LLC, San Mateo, CA (US)

(72) Inventors: Mischa Stephens, San Mateo, CA (US); Dustin Shawn Clingman, San Mateo, CA (US); Adil Sherwani, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 108 days.

(21) Appl. No.: 16/379,683

(22) Filed: Apr. 9, 2019

(65) Prior Publication Data

US 2020/0188781 A1 Jun. 18, 2020

Related U.S. Application Data

(63) Continuation-in-part of application No. 16/220,443, filed on Dec. 14, 2018.

(51) Int. Cl.
*A63F 13/79* (2014.01)
*A63F 13/355* (2014.01)
(Continued)

(52) U.S. Cl.
CPC ............ *A63F 13/79* (2014.09); *A63F 13/355* (2014.09); *A63F 13/537* (2014.09);
(Continued)

(58) Field of Classification Search
CPC ...... A63F 13/355; A63F 13/537; A63F 13/79; G06F 3/0482; H04N 21/4722; H04N 21/8126
See application file for complete search history.

(56) References Cited

U.S. PATENT DOCUMENTS 8,448,095 B1 * 5/2013 Haussila ............... G06F 3/0487
715/863
8,764,555 B2 7/2014 Quan et al.
(Continued)

FOREIGN PATENT DOCUMENTS

CN 113710337 11/2021
CN 113710340 11/2021
(Continued)

OTHER PUBLICATIONS

U.S. Appl. No. 16/220,465 Office Action dated Jun. 15, 2020.
(Continued)

*Primary Examiner* — Jefferey F Harold
*Assistant Examiner* — Alexander Boyd
(74) *Attorney, Agent, or Firm* — Polsinelli LLP (57) ABSTRACT

A system and method for providing interactive media streaming is provided. Media and a set of activity data associated with the media may be stored in memory. The set of activity data may include information about the activity and one or more objects shown in the activity. A user selection of the media may be detected. Object information for one or more object images displayed may be retrieved from the associated set of activity data. A list of retrieved object information may be displayed.

22 Claims, 5 Drawing Sheets

(51) Int. Cl.
  *A63F 13/537* (2014.01)
  *G06F 3/0482* (2013.01)
  *H04N 21/4722* (2011.01)
  *H04N 21/81* (2011.01)

(52) U.S. Cl.
  CPC ....... *G06F 3/0482* (2013.01); *H04N 21/4722* (2013.01); *H04N 21/8126* (2013.01)

(56) References Cited

U.S. PATENT DOCUMENTS

| | | | |
|---|---|---|---|
| 9,168,460 | B2 | 10/2015 | Pearce |
| 9,381,425 | B1* | 7/2016 | Curtis .................. A63F 13/822 |
| 9,795,879 | B2 | 10/2017 | Colenbrander |
| 10,109,003 | B1* | 10/2018 | Jenkins .............. G06Q 30/0633 |
| 10,564,820 | B1* | 2/2020 | Cabanero ............ G06F 3/04815 |
| 10,843,085 | B2 | 11/2020 | Stephens |
| 10,881,962 | B2 | 1/2021 | Stephens |
| 11,080,748 | B2 | 8/2021 | Stephens |
| 11,213,748 | | 1/2022 | Jarzebinski |
| 2008/0262858 | A1 | 10/2008 | Broady et al. |
| 2009/0170609 | A1 | 7/2009 | Kang et al. |
| 2009/0276713 | A1 | 11/2009 | Eddy |
| 2010/0070613 | A1 | 3/2010 | Chen et al. |
| 2011/0067061 | A1 | 3/2011 | Karaoguz et al. |
| 2011/0113149 | A1 | 5/2011 | Kaal |
| 2011/0314029 | A1 | 12/2011 | Fischer et al. |
| 2011/0319229 | A1 | 12/2011 | Corbalis et al. |
| 2012/0004956 | A1 | 1/2012 | Huston et al. |
| 2012/0094762 | A1 | 4/2012 | Khan |
| 2012/0206574 | A1* | 8/2012 | Shikata ................ H04N 13/128 348/46 |
| 2012/0317198 | A1 | 12/2012 | Patton et al. |
| 2013/0064527 | A1 | 3/2013 | Maharajh et al. |
| 2013/0086484 | A1 | 4/2013 | Antin et al. |
| 2013/0165234 | A1 | 6/2013 | Hall et al. |
| 2013/0212342 | A1 | 8/2013 | McCullough et al. |
| 2013/0244785 | A1 | 9/2013 | Gary |
| 2014/0199045 | A1 | 7/2014 | Lee et al. |
| 2014/0204014 | A1 | 7/2014 | Thorn et al. |
| 2014/0206456 | A1 | 7/2014 | Koplar |
| 2014/0228112 | A1 | 8/2014 | Laakkonen et al. |
| 2014/0243098 | A1 | 8/2014 | Yong et al. |
| 2015/0026728 | A1 | 1/2015 | Carter et al. |
| 2015/0081777 | A1 | 3/2015 | Laine et al. |
| 2015/0142799 | A1 | 5/2015 | Eronen et al. |
| 2015/0224396 | A1 | 8/2015 | Okada |
| 2015/0245084 | A1 | 8/2015 | Downing et al. |
| 2015/0296250 | A1* | 10/2015 | Casper ............... H04N 21/4722 725/34 |
| 2015/0331856 | A1 | 11/2015 | Choi et al. |
| 2015/0381689 | A1 | 12/2015 | Ganesh et al. |
| 2016/0005326 | A1 | 1/2016 | Syrmis et al. |
| 2016/0029153 | A1 | 1/2016 | Linn et al. |
| 2016/0078471 | A1 | 3/2016 | Hamedi |
| 2016/0147890 | A1 | 5/2016 | Wissner et al. |
| 2016/0149956 | A1 | 5/2016 | Birnbaum et al. |
| 2016/0277349 | A1 | 9/2016 | Bhatt et al. |
| 2016/0350813 | A1 | 12/2016 | Balasubramanian et al. |
| 2017/0050111 | A1 | 2/2017 | Perry et al. |
| 2017/0087460 | A1* | 3/2017 | Perry ..................... A63F 13/25 |
| 2017/0126757 | A1 | 5/2017 | Kuo et al. |
| 2017/0188116 | A1 | 6/2017 | Major et al. |
| 2017/0301041 | A1 | 10/2017 | Schneider |
| 2017/0339093 | A1 | 11/2017 | Pesavento et al. |
| 2017/0354888 | A1 | 12/2017 | Benedetto et al. |
| 2018/0001216 | A1 | 1/2018 | Bruzzo et al. |
| 2018/0014077 | A1 | 1/2018 | Hou et al. |
| 2018/0021684 | A1 | 1/2018 | Benedetto |
| 2018/0033250 | A1 | 2/2018 | O'Heeron et al. |
| 2018/0101614 | A1 | 4/2018 | Kuipers et al. |
| 2018/0126279 | A1 | 5/2018 | Stelovsky et al. |
| 2018/0192142 | A1 | 7/2018 | Paul |
| 2018/0318708 | A1 | 11/2018 | Rom et al. |
| 2018/0343505 | A1 | 11/2018 | Loheide et al. |
| 2018/0359477 | A1 | 12/2018 | Yang |
| 2019/0208242 | A1 | 7/2019 | Bates et al. |
| 2019/0246149 | A1 | 8/2019 | Reza et al. |
| 2019/0282906 | A1 | 9/2019 | Yong |
| 2019/0297376 | A1 | 9/2019 | McCarty et al. |
| 2020/0114267 | A1* | 4/2020 | Sakurai ............... A63F 13/5372 |
| 2020/0147489 | A1 | 5/2020 | Mahlmeister et al. |
| 2020/0184041 | A1* | 6/2020 | Andon .................... G06F 21/16 |
| 2020/0188792 | A1 | 6/2020 | Stephens |
| 2020/0188794 | A1 | 6/2020 | Stephens |
| 2020/0188796 | A1 | 6/2020 | Stephens |
| 2020/0188800 | A1 | 6/2020 | Stephens |
| 2020/0192929 | A1 | 6/2020 | Stephens |
| 2020/0193476 | A1 | 6/2020 | Stephens |
| 2020/0193477 | A1 | 6/2020 | Stephens |
| 2021/0077907 | A1 | 3/2021 | Stephens |
| 2021/0129023 | A1 | 5/2021 | Jarzebinski |
| 2021/0370169 | A1 | 12/2021 | Clingman |
| 2021/0370185 | A1 | 12/2021 | Clingman |
| 2021/0374180 | A1 | 12/2021 | Clingman |

FOREIGN PATENT DOCUMENTS

| | | |
|---|---|---|
| CN | 113727764 | 11/2021 |
| CN | 113727765 | 11/2021 |
| KR | 2018-0094833 | 8/2018 |
| WO | WO 2009/094611 | 7/2009 |
| WO | WO 2014/047490 | 3/2014 |
| WO | WO 2017/182642 | 10/2017 |
| WO | WO 2017/188677 | 11/2017 |
| WO | WO 2020/123115 | 6/2020 |
| WO | WO 2020/123116 | 6/2020 |
| WO | WO 2020/123117 | 6/2020 |
| WO | WO 2020/123118 | 6/2020 |
| WO | WO 2021/086561 | 5/2021 |
| WO | WO 2021/242476 | 12/2021 |
| WO | WO 2021/242477 | 12/2021 |
| WO | WO 2021/242478 | 12/2021 |

OTHER PUBLICATIONS

U.S. Appl. No. 16/358,546 Office Action dated May 20, 2020.
U.S. Appl. No. 16/885,629, Dustin S. Clingman, Media-Object Binding for Displaying Real-Time Play Data for Live-Streaming Media, filed May 28, 2020.
U.S. Appl. No. 16/885,653, Dustin S. Clingman, Media-Object Binding for Predicting Performance in a Media, filed May 28, 2020.
U.S. Appl. No. 16/885,641, Dustin S. Clingman, Media-Object Binding for Dynamic Generation and Displaying of Play Data Associated With Media, filed May 28, 2020.
PCT Application No. PCT/US2019/062602 International Search Report and Written Opinion dated Feb. 14, 2020.
U.S. Appl. No. 16/380,760 Office Action dated Mar. 6, 2020.
U.S. Appl. No. 16/220,397, Mischa Stephens, Targeted Gaming News and Content Feeds, filed Dec. 14, 2018.
U.S. Appl. No. 16/359,160, Mischa Stephens, Targeted Gaming News and Content Feeds, filed Mar. 20, 2019.
U.S. Appl. No. 16/220,443, Mischa Stephens, Interactive Objects in Streaming Media and Marketplace Ledgers, filed Dec. 14, 2018.
U.S. Appl. No. 16/220,460, Mischa Stephens, Media-Activity Binding and Content Blocking, filed Dec. 14, 2018.
U.S. Appl. No. 16/380,760, Mischa Stephens, Media-Activity Binding and Content Blocking, filed Apr. 10, 2019.
U.S. Appl. No. 16/220,465, Mischa Stephens, Experience-Based Peer Recommendations, filed Dec. 14, 2018.
U.S. Appl. No. 16/358,546, Mischa Stephens, Experience-Based Peer Recommendations, filed Mar. 19, 2019.
PCT Application No. PCT/US2019/062626 International Search Report and Written Opinion dated Jan. 29, 2020.
PCT Application No. PCT/US2019/062606 International Search Report and Written Opinion dated Jan. 30, 2020.
PCT Application No. PCT/US2019/062613 International Search Report and Written Opinion dated Feb. 3, 2020.
U.S. Appl. No. 16/220,460 Office Action dated Jan. 28, 2020.

(56) References Cited

OTHER PUBLICATIONS

PCT/US19/62602, Targeted Gaming News and Content Feeds, Nov. 21, 2019.
PCT/US19/62626, Interactive Objects in Streaming Media and Marketplace Ledgers, Nov. 21, 2019.
PCT/US19/62606, Media-Activity Binding and Content Blocking, Nov. 21, 2019.
PCT/US19/62613, Experience-Based Peer Recommendations, Nov. 21, 2019.
PCT Application No. PCT/US2020/054603 International Search Report and Written Opinion dated Jan. 28, 2021.
U.S. Appl. No. 16/220,465 Final Office Action dated Dec. 24, 2020.
U.S. Appl. No. 16/358,546 Final Office Action dated Jan. 27, 2021.
U.S. Appl. No. 16/220,397 Office Action dated Sep. 25, 2020.
U.S. Appl. No. 16/359,160 Office Action dated Nov. 13, 2020.
U.S. Appl. No. 16/220,443 Office Action dated Oct. 19, 2020.
Li et al., "Distributed Multimedia Systems", IEEE, Jul. 1997, retrieved on [Feb. 7, 2021], Retrieved from the internet <URL: https://citeseerx.ist.psu.edu/viewdoc/download?doi=10.1.1.128.9759&rep1&type=pdf>.
PCT Application No. PCT/US2019/062602 International Preliminary Report on Patentability dated Jun. 8, 2021.
PCT Application No. PCT/US2019/062606 International Preliminary Report on Patentability dated Jun. 8, 2021.
PCT Application No. PCT/US2019/062613 International Preliminary Report on Patentability dated Jun. 8, 2021.
PCT Application No. PCT/US2019/062626 International Preliminary Report on Patentability dated Jun. 8, 2021.
PCT Application No. PCT/US2021/030378 International Search Report and Written Opinion dated Aug. 5, 2021.
PCT Application No. PCT/US2021/030379 International Search Report and Written Opinion dated Aug. 5, 2021.
PCT Application No. PCT/US2021/030380 International Search Report and Written Opinion dated Aug. 12, 2021.
U.S. Appl. No. 16/359,160 Office Action dated Jul. 12, 2021.
U.S. Appl. No. 16/220,443 Office Action dated Aug. 6, 2021.
U.S. Appl. No. 16/220,465 Office Action dated Jul. 26, 2021.
U.S. Appl. No. 16/358,546 Office Action dated Jun. 23, 2021.
U.S. Appl. No. 16/359,160 Final Office Action dated Mar. 12, 2021.
U.S. Appl. No. 16/220,443 Final Office Action dated Apr. 13, 2021.
U.S. Appl. No. 16/679,795 Office Action dated May 10, 2021.
U.S. Appl. No. 16/358,546 Final Office Action dated Nov. 1, 2021.

* cited by examiner

INTERACTIVE OBJECTS IN STREAMING MEDIA AND MARKETPLACE LEDGERS

CROSS-REFERENCE TO RELATED APPLICATION

This application is a continuation-in-part of U.S. patent application Ser. No. 16/220,443 filed Dec. 14, 2018, which is incorporated by reference herein in its entirety.

BACKGROUND OF THE INVENTION

1. Field of the Invention

The present technology pertains to streaming media. More specifically, the present technology may provide interactive objects in streaming media and marketplace ledgers.

2. Description of the Related Art

Gaming media is an increasingly popular and growing information source for game players. Such gaming media (e.g., from a game publisher or game-related content created by peer players) may incentivize further gameplay, promote new features of a game or a new game, or provide gameplay help. Presently available gaming media may include media streamed to a user (e.g., video streams), which may feature unique activities or items. Typically, a user must search various sources to obtain more information pertaining to the unique activities or items.

Due to the popularity of gaming, viewing activities or objects out of context may frustrate a user. Lack of information pertaining to and/or inability to interact with an activity or object while viewing gaming media may, for example, detract from the user experience because the user may not know how to access such activity or obtain such object. Further, such lack of information may dis-incentivize a user from gameplay.

There is, therefore, a need in the art for systems and methods for interactive objects in streaming media and marketplace ledgers.

SUMMARY OF THE PRESENTLY CLAIMED INVENTION

Embodiments of the present invention include systems and methods for providing interactive objects in streaming media and for marketplace ledgers. Media and a set of activity data associated with the media may be stored in memory. The media (e.g., user generated content or publisher content) may depict an activity. The media may have a length of time. The set of activity data may include information about the activity and one or more objects shown in the activity. The set of activity data may include at least one time stamp corresponding to time within the media. Such set of activity data may include data about a result, activity information, activity type, number of users, or duration of the activity. A user selection of the media may be detected. Such user selection may include a selection time stamp corresponding to one of the plurality of time stamps of the media. The selection time stamp may be matched to one of the at least one time stamp of the set of activity data. Object information for one or more objects shown may be retrieved from the associated set of activity data. The object information may be retrieved based on the selection time stamp corresponding to the matched time stamp of the set of activity data. A list of the retrieved object information for the one or more object images may be displayed. A user selection of the one or more object images may be received.

Various embodiments may include methods for providing interactive media streaming. Such methods may include retrieving media and a set of activity data. Such media may depict an activity. Such media may have a length of time. Such set of activity data may have data about the activity and one or more objects shown in the activity. Such set of activity data may have at least one time stamp corresponding to time within the media. Such methods may include detecting a user selection of the media. Such method may include matching a selected time of the media corresponding with the detection of the user selection to one of the at least one time stamp of the set of activity data. Such methods may include retrieving object information for one or more object images displayed in the media from the set of activity data. The retrieved object information may correspond to the matched time stamp of the set of activity data. Such methods may include displaying a list of the retrieved object information for the one or more object images. Such methods may include receiving a user selection of one of the one or more object images.

Additional embodiments may include systems for providing interactive media streaming. Such systems may include memory that stores at least one media. Each media may depict an activity. Each media may have a length of time. Such memory may store at least one set of activity data. Each set of activity data may be associated with each media. Each set of activity data may have at least one time stamp corresponding with time within the media. Each set of activity data may include data about the activity and one or more objects shown in the activity. Such system may include a processor that executes instructions stored in memory. Execution of the instructions by the processor may detect a user selection of the media. Execution of the instructions by the processor may match a selected time of the media corresponding with the detection of the user selection to one of the at least one time stamp of the set of activity data. Execution of the instructions by the processor may retrieve object information for one or more object images displayed in the media from the set of activity data. The retrieved object information may correspond to the matched time stamp of the activity file. Execution of the instructions by the processor may display a list of the retrieved object information for the one or more object images. Execution of the instructions by the processor may receive a user selection of one of the one or more object images.

Further embodiments include non-transitory computer-readable storage media having embodied thereon a program executable by a processor to provide interactive streaming media.

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

A system and method for providing interactive media streaming and marketplace ledgers is provided. Media and a set of activity data associated with the media may be stored in memory. The media may depict an activity and may have a length of time. The set of activity data may include information about the activity and one or more objects shown in the activity. The set of activity data may include at least one time stamp corresponding with time within the media. A user selection of the media may be detected. A selected time of the media corresponding with the detection of the user selection may be matched to one of the at least one time stamp of the set of activity data. Object information for one or more objects shown may be retrieved from the associated set of activity data. Such retrieved object information may correspond to the matched time stamp of the set of activity data. A list of the retrieved object information for the one or more object images may be displayed. A user selection of the one or more object images may be received.

Figure 1:
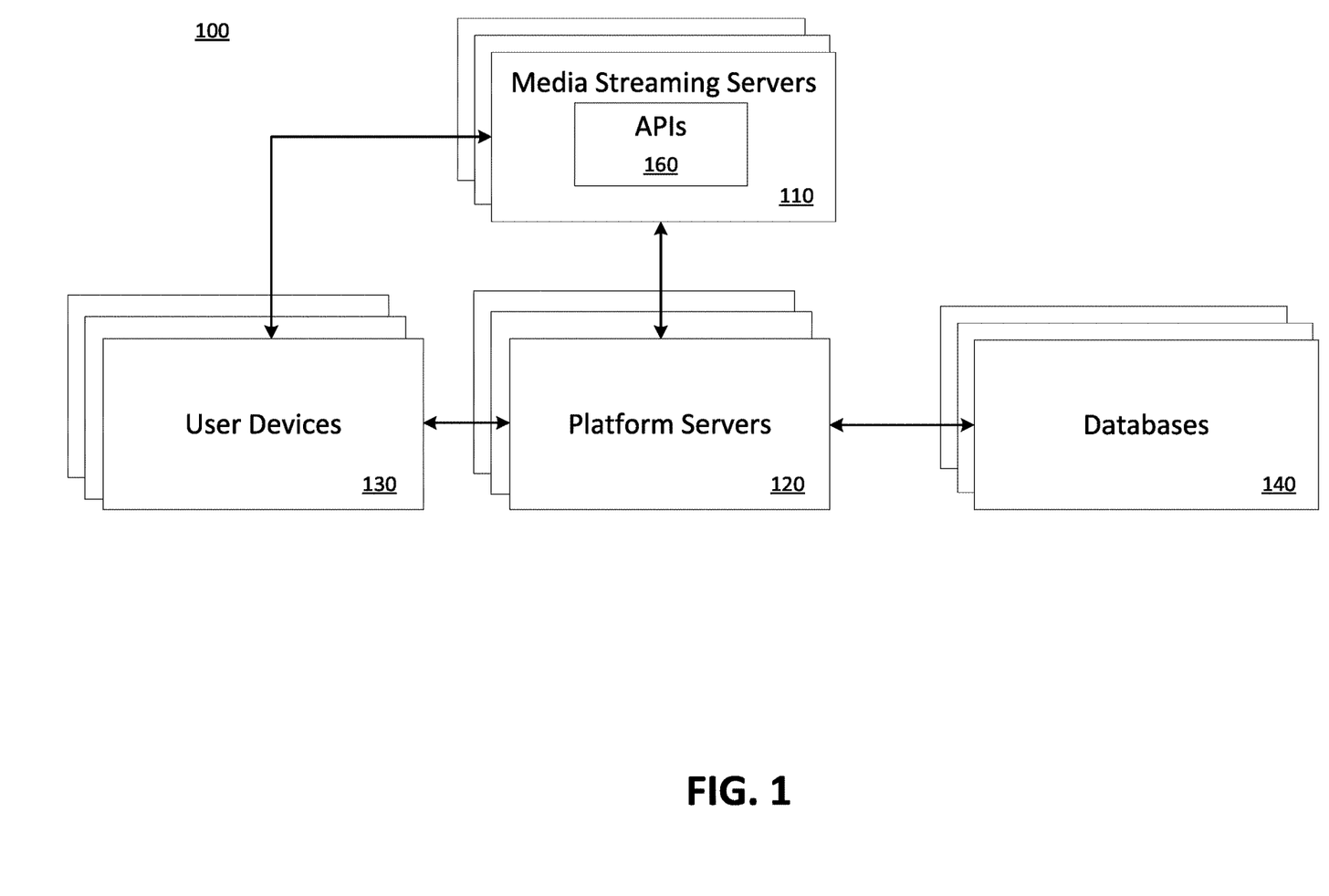
FIG. 1 illustrates an exemplary network environment in which a system for interactive objects in streaming media and marketplace ledgers may be implemented.

FIG. 1 illustrates an exemplary network environment 100 in which a system for providing interactive objects in streaming media and marketplace ledgers can occur. The network environment 100 may include one or more media streaming servers 110 that provide streaming content (e.g., interactive video, podcasts, etc.), platform servers 120, one or more user devices 130, and one or more databases 140.

Media streaming servers 110 may maintain and host interactive streaming media available to stream on a user device 130 over a communication network. Such media streaming servers 110 may be implemented in the cloud (e.g., one or more cloud servers). Each streaming media may include one or more activities shown, and each activity may include one or more object images displayed and available for interaction with by a user. Data about a user interaction with an activity and/or object image shown in the streaming media may be stored by the platform servers 120 and/or the user device 130, as will be discussed in detail with respect to FIG. 2.

The platform servers 120 may be responsible for communicating with the different media streaming servers 110, databases 140, and user devices 130. Such platform servers 120 may be implemented on one or more cloud servers. The media streaming servers 110 may communicate with multiple platform servers 120, though the media streaming servers 110 may be implemented on one or more platform servers 120. The platform servers 120 may also carry out instructions, for example, retrieving a media file 212, shown in FIG. 2, having a media (i.e., video, podcasts, User Generated Content, publisher content, etc.) and a corresponding UDS activity file 216, also shown in FIG. 2, having object information for each object shown in the media. In another example, such activity file 216 may be retrieved when a user selects an object image or any other time. Such media may have a length of time (e.g., a content time stamp file 214). The corresponding activity file 216 may include at least one time stamp corresponding to time stamps of the content time stamp file 214. One or more object images shown in the media may be associated with at least one of the plurality of time stamps. Such object images may correspond to object information and/or object metadata stored in the activity file 216.

The platform servers 120 may further carry out instructions, for example, for detecting a user selection of an object image shown in the media. The platform servers 120 may further carry out instructions, for example, for matching a selected time of the media corresponding with the detection of the user selection to one of the at least one time stamp of the activity file. The platform servers 120 may further carry out instructions, for example, for retrieving objection information and/or object metadata for one or more object images displayed in the media. The retrieved object information may correspond to the matched time stamp of the activity file. The platform servers 120 may further carry out instructions, for example, for transmitting the retrieved object information and object metadata to the user device 130.

The streaming media and their corresponding activity information may be provided through an application programming interface (API) 160, which allows various types of media streaming servers 110 to communicate with different platform servers 120 and different user devices 130. API 160 may be specific to the particular computer programming language, operating system, protocols, etc., of the media streaming servers 110 providing the streaming media, the platform servers 120 providing the associated activity and/or object information, and user devices 130 receiving the same. In a network environment 100 that includes multiple different types of media streaming servers 110 (or platform servers 120 or user devices 130), there may likewise be a corresponding number of APIs 160.

Figure 4A:
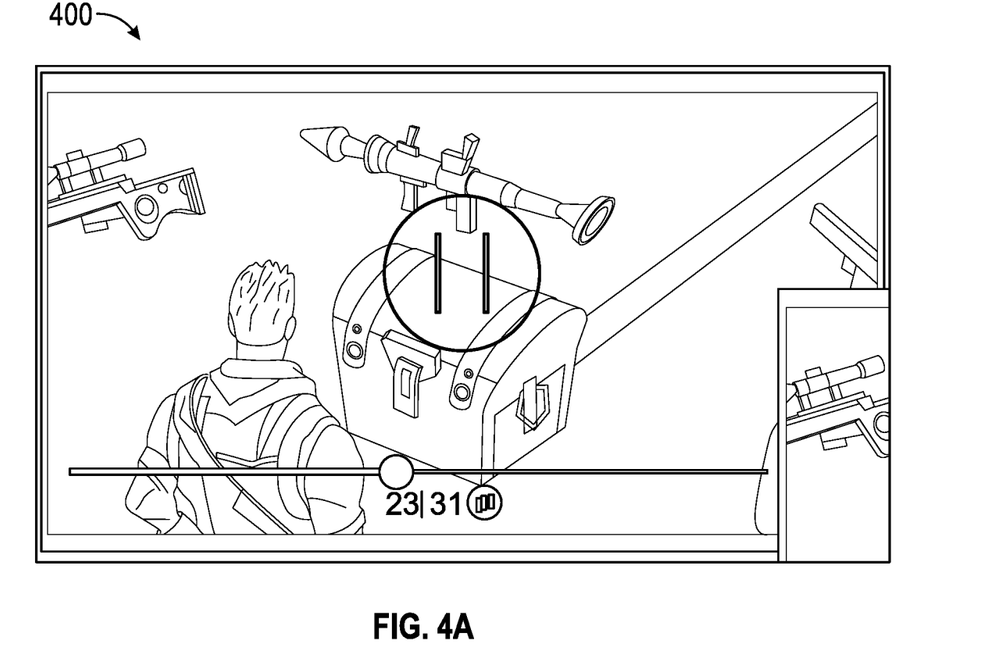
FIGS. 4A and 4B illustrate an exemplary display of a scene depicting a user or peer gameplay and a list of objects within the scene, respectively.

The user device 130 may include a plurality of different types of computing devices. For example, the user device 130 may include any number of different gaming consoles, mobile devices, laptops, and desktops. In another example, the user device 130 may be implemented in the cloud (e.g., one or more cloud servers). Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). An exemplary user device 130 is described in detail herein with respect to FIG. 4.

The databases 140 may be stored on the platform server 120, the media streaming servers 110, any of the servers 218 (shown in FIG. 2), on the same server, on different servers, on a single server, or across different servers. Such databases 140 may store history information for an object (e.g., ownership history, object history, and/or object modifications, etc.), information about the object (e.g., type, use, capabilities, etc.), and/or object metadata. Such databases 140 may also store streaming media from publishers of interactive content titles and/or third party publishers or UGG (e.g., screen shots, videos, commentary, mashups, etc.) created by peers. Such UGC may include metadata by which to search for such media. Such UGC may also include information about the interactive content title, information about a peer that created the UGC, and/or information about the peer interaction with the interactive content title shown in the UGC. Such information may be derived from data gathered during peer interaction with an activity of an interactive content title and stored in an activity file (shown in FIG. 2). Such information may be "bound" to the UGC and stored with the UGC. Such binding enhances UGC as the UGC may deep link (e.g., directly launch) to an interactive content title, may provide for information about an activity and/or a peer of the UGC, may allow a user to interact with the UGC, and/or allow the user to add one or more objects shown in a media to the user's own inventory or collection.

Figure 2:
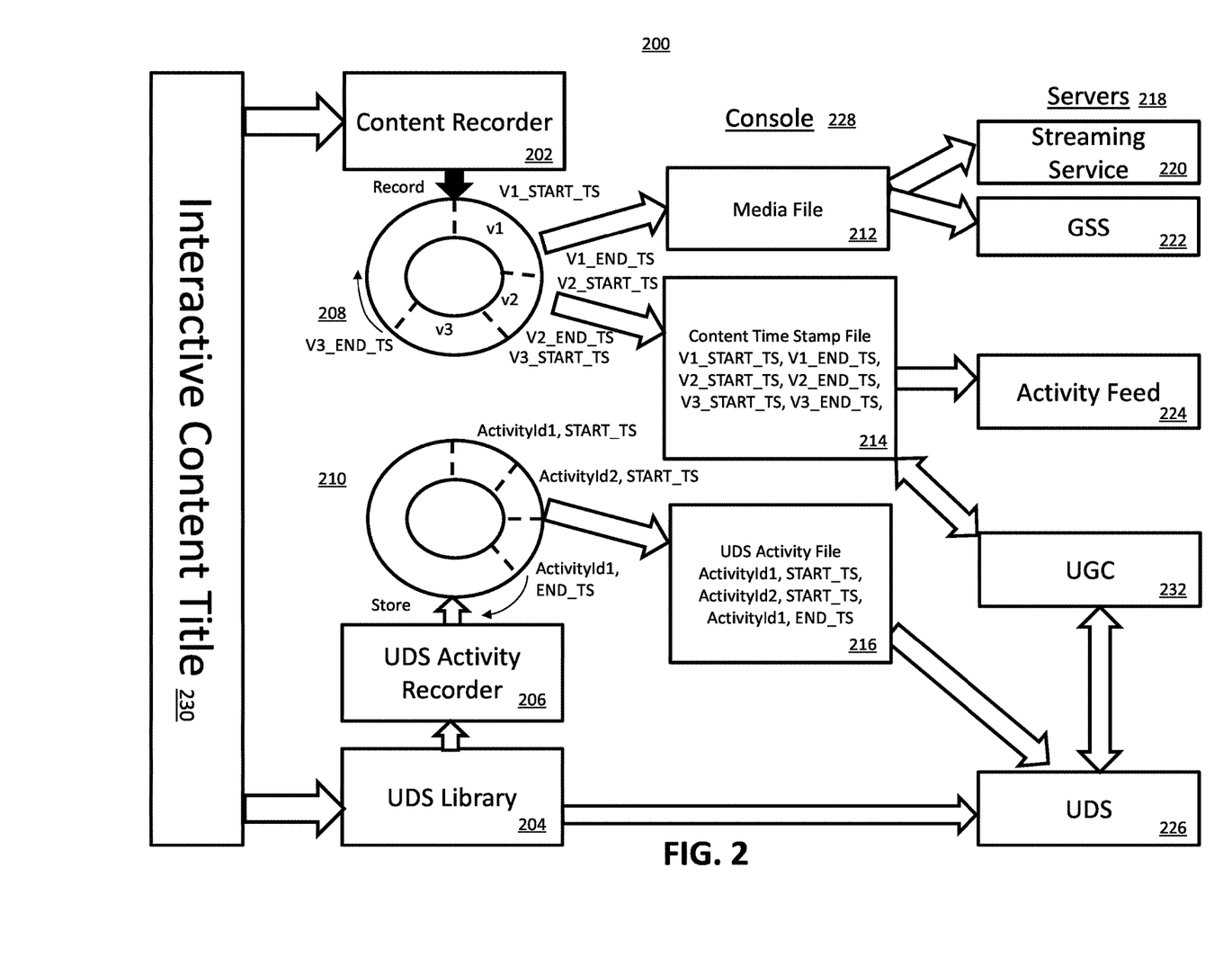
FIG. 2 illustrates a detailed exemplary network in which a system for binding data from a universal data system to user generated content may be implemented.

In the exemplary network environment 200 of FIG. 2, an exemplary console 228 (e.g., a user device 130) and exemplary servers 218 (e.g., streaming server 220, Ghost Solution Suite Server (GSS Server) 222, activity feed server 224, UGC server 232, and Universal Data Systems (UDS) server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 and/or the GSS Server 222 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID or GSS ID, which matches a streaming ID or GSS ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Concurrent to the content recorder 202 receiving and recording content from the interactive content title 230, a UDS library 204 receives data from the interactive content title 230, and a UDS activity recorder 206 tracks the data to determine when an activity beings and ends. The UDS library 204 and the UDS activity recorder 206 may be implemented on the platform server 120, a cloud server, or on any of the servers 218. When the UDS activity recorder 206 detects an activity beginning, the UDS activity recorder 206 receives activity data (e.g., user interaction with the activity, activity ID, activity start times, activity end times, activity results, activity types, object information, object metadata, etc.) from the UDS library 204 and records the activity data onto a UDS ring-buffer 210 (e.g., ActivityID1, START_TS; ActivityID2, START_TS; ActivityID3, START_TS). Such activity data recorded onto the UDS ring-buffer 210 may be stored in a UDS activity file 216. Such UDS activity file 216 may also include activity start times, activity end times, an activity ID, activity results, activity types (e.g., competitive match, quest, task, etc.), object metadata, object information, and/or user or peer data related to the activity. For example, a UDS activity file 216 may store data regarding an object used during the activity such as type, capabilities, and/or requirements to use objects (e.g., required skill level, character type, etc.). Such UDS activity file 216 may be stored on the UDS server 226, though the UDS activity file 216 may be stored on any server, a cloud server, any console 228, or any user device 130.

Such UDS activity data (e.g., the UDS activity file 216) may be associated with the content data (e.g., the media file 212 and/or the content time stamp file 214). In one example, the UGC server 232 stores and associates the content time stamp file 214 with the UDS activity file 216 based on a match between the streaming ID or GSS ID of the content time stamp file 214 and a corresponding activity ID of the UDS activity file 216. In another example, the UDS server 226 may store the UDS activity file 216 and may receive a query from the UGC server 232 for a UDS activity file 216. Such query may be executed by searching for an activity ID of a UDS activity file 216 that matches a streaming ID or GSS ID of a content time stamp file 214 transmitted with the query. In yet another example, a query of stored content time stamp files 214 may be executed by matching a start time and end time of a content time stamp file 214 with a start time and end time of a corresponding UDS activity file 216 transmitted with the query. Such UDS activity file 216 may also be associated with the matched content time stamp file 214 by the UGC server 232, though the association may be performed by any server, a cloud server, any console 228, or any user device 130. In another example, a UDS activity file 216 and a content time stamp file 214 may be associated by the console 228 during creation of each file 216, 214.

Figure 3:
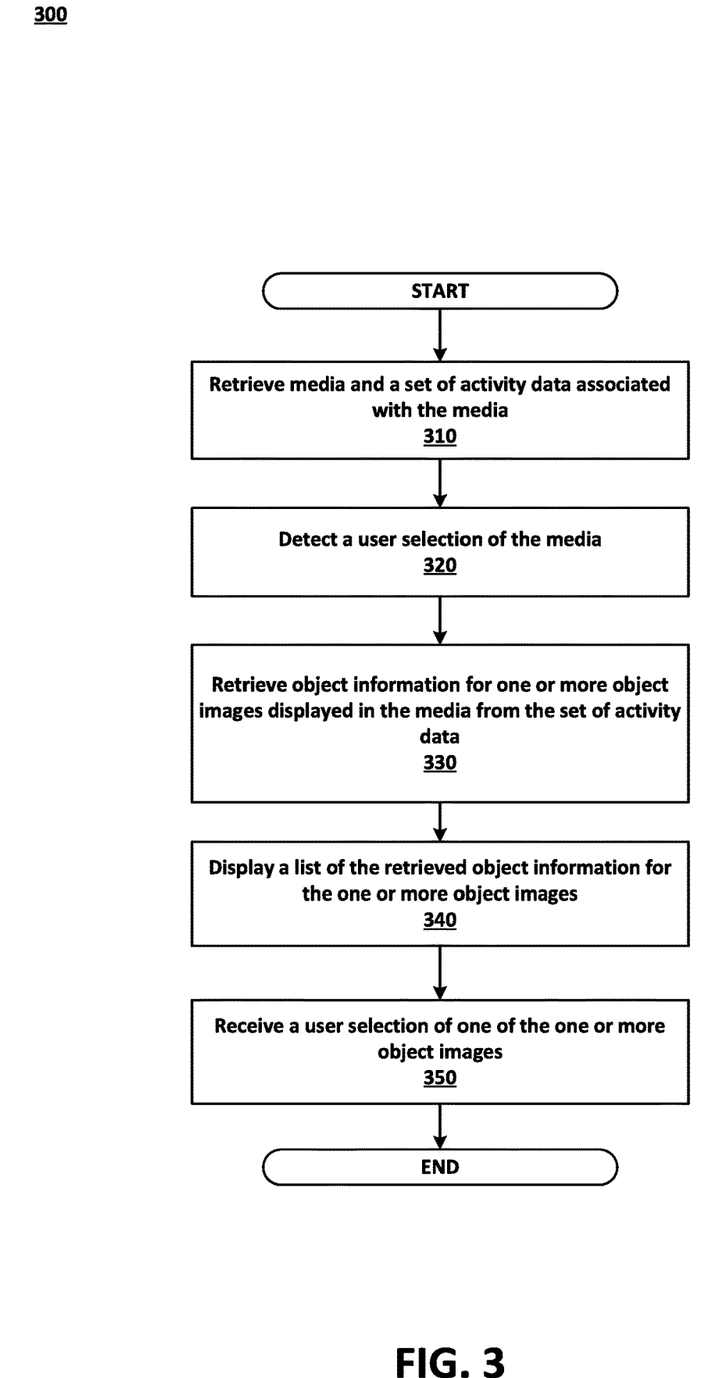
FIG. 3 is a flowchart illustrating an exemplary method for providing interactive objects in streaming media and marketplace ledgers.

FIG. 3 is a flowchart illustrating an exemplary method 300 for providing interactive objects in streaming media and marketplace ledgers. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers (e.g., the steps identified in FIG. 3 are performed in the cloud). The steps identified in FIG. 3 (and the order thereof) are exemplary and may include various alternatives, equivalents, or derivations thereof including but not limited to the order of execution of the same.

In step 310, media (i.e., media file 212) and a set of activity data (i.e., UDS activity file 216) associated with the media are retrieved by the platform server 120 or the media streaming server 110 from the databases 140 and/or the user devices 130. Such media file may have recorded content (e.g., UGC, streaming media, content from a publisher or third party publisher, etc.). As previously described, the media may be UGC. Such media may display object images. In one embodiment the object images may be selected by a user. The media may include a length of time (e.g., a content time stamp file 214). The set of activity data may include at least one time stamp associated with the time within the media. The set of activity data may include an activity ID associated with a media ID of the media. The set of activity data may include data about the activity (e.g., a result of a match or quest, activity type, number of users, duration, etc.), and/or object information depicted and/or used in the activity by the user.

Further, such set of activity data may include information about an interactive content title associated with the activity (e.g., type of activities offered in the title, multi- vs. single-user, special objects offered in the title, duration, etc.). Such set of activity data may also include a link to the interactive content title such that the user can interactive with and/or purchase the interactive content title. If the user owns the interactive content title, the link may deep-link directly to the interactive content title such that the user can instantly begin interacting with the interactive content title after selecting an object of the content or selecting any portion of the content.

In step 320, a user selection of the media is detected by the platform server 120 or the media streaming server 110. For example, a user may view a streaming media wherein a character is shown using a sword. In the same example, the user may click or select the sword to receive more information about the sword. Such media may be streamed by the platform server 120 or the streaming server 110 on the user device 130. Such streaming media may be streamed by a media player or a website (e.g., YouTube, Media Player, Vimeo, etc.). Such streaming media may show an activity of an interactive content title at a point in time. The user selection may include a selection time stamp corresponding to one of the plurality of time stamps of media.

In step 330, objection information for one or more object images displayed in the media are retrieved from the set of activity data by the platform server 120 or the media streaming server 110. Such retrieval may be based on a match selected time of the media corresponding with the detection of the user selection to one of the at least one time stamps of the activity file. Such retrieved object information may correspond to the matched time stamp of the set of activity data.

Figure 4B:
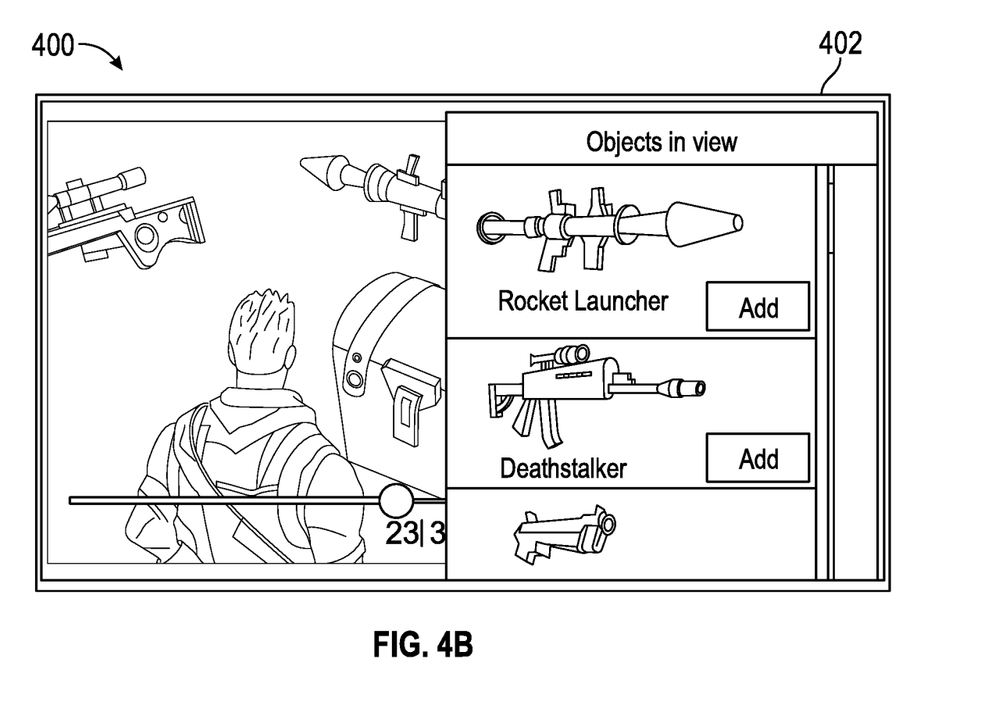

In step 340, a list of the retrieved object information for the one or more object images is displayed by the platform server 120 or the media streaming server 110. Such list may be displayed in an inset of the media. For example, FIGS. 4A and 4B illustrate an exemplary display of a scene 400 of media depicting a user or peer gameplay and a list of objects 402 within the scene 400, respectively. Such media may be paused and a list of objects 402 that appear in the scene 400 may be displayed to the user. In the same example, the user may wish to view the weapons displayed in the scene 400 and may pause the media (e.g., a video) or click the scene to pause it. When the media is paused, the list of objects 402 (e.g., a list of weapons) may be displayed to the user and the user may further select one of the objects to retrieve more information about the object or to add the object to the user's inventory, which will be discussed in more detail below.

In another example, the list may be displayed on a separate display window from the media and may be displayed on the user device 130. Such list may be displayed while the media continues to stream or display of the list may pause the media. Such list may be filtered based on a user request. For example, the list may be filtered by object type (i.e., weapon, item, melee weapon, projectile weapon, potion, map, clothing, mount, etc.), skill level required to use and/or possess the objects, objects owned by one or more peers, or the like.

Activity information may also be displayed pertaining to the object. For example, a hint on where the object is located within the activity may be displayed to incentivize a user to continue or begin interaction with an interactive content title. In another example, a help video may be provided to aid the user in obtaining the object within the activity.

Returning to FIG. 3, in step 360, a user selection of one of the one or more object images is received by the platform server 120 or the media streaming server 110. In one example, object metadata of the user selected object image may be retrieved from the database 140, or any database, and may be displayed to the user. In another example, object metadata corresponding to one or more object images shown in either the same scene, before, or after the scene as the selected object image may also be retrieved.

A user request to add one or more of the objects to a user account may be received. Such user request may retrieve and add object metadata of the requested object to user account. Such user request may also be denied based on object requirements (i.e., character skill level, ownership of the interactive content title associated with the object, ownership of the object, etc.). Such object requirements may generate a notification to the user concerning the object requirements. Such notification may provide an offer to the user to purchase the corresponding interactive content title and/or to purchase the object.

The object metadata may include a unique identifier stored in a history ledger (e.g., ownership history, object history, and/or object modifications). Such unique identifier may protect against copies of the object. The history ledger may include unique storylines, videos, screenshots, and/or owners of the object. In one embodiment, the object information may include an ownership ledger having at least one unique owner identification identifying a current owner and/or previous owners. Such history and/or ownership ledger may be stored on the platform servers 120 or a separate server. Such ledger may also be a distributed ledger that is stored and updated across a plurality of servers and/or user devices. Such ledger may provide for objects that are tradable and/or sellable across interactive content titles. Additionally, the history and/or ownership ledger may be displayed pertaining to the object. Such history and/or ownership ledger may incentive a user seek out the object based on, for example, a unique history or ties to a famous user.

Such systems and methods for provide interactive objects in streaming media and marketplace ledgers enhance a user's experience by providing for interactive streaming media. Such interactions may incentivize users to continue or begin gameplay with an interactive content title. Further, object information may incentivize a user to purchase the interactive content title associated with the object. Such object information may further incentivize a user to continue or begin interaction with an interactive content title to reach a certain time period in the title where the object is located. In other words, a user may be incentivized to continue playing a title until the object is reached. Further, unique ownership history may incentivize selling and/or trading of unique objects.

Figure 5:
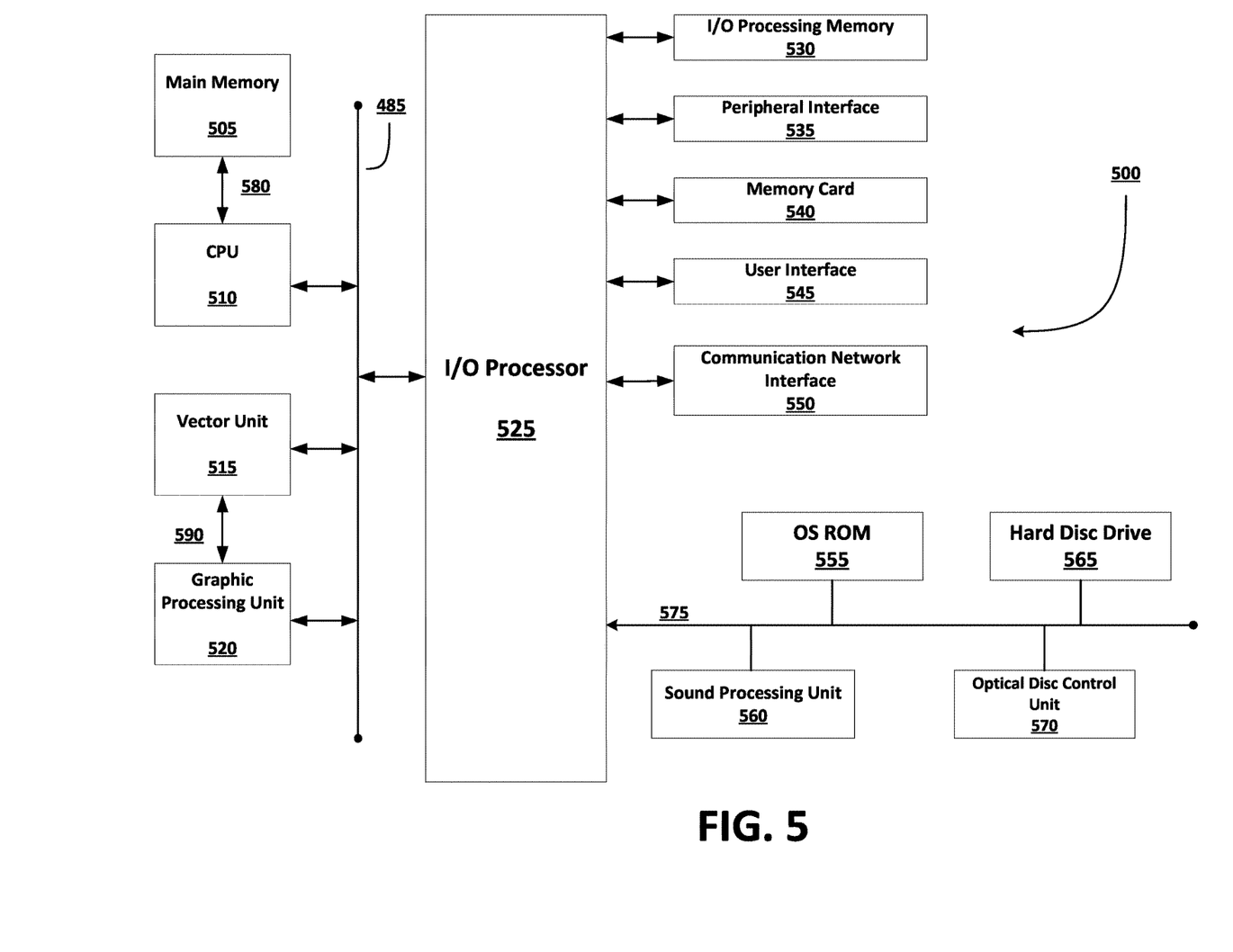
FIG. 5 is an exemplary electronic entertainment system that may be used in providing interactive objects in streaming media and marketplace ledgers.

FIG. 5 is an exemplary user electronic entertainment system that may be used in launching interactive content and providing dynamic interfaces. The entertainment system 500 of FIG. 5 includes a main memory 505, a central processing unit (CPU) 510, vector unit 515, a graphics processing unit 520, an input/output (I/O) processor 525, an I/O processor memory 530, a peripheral interface 535, a memory card 540, a Universal Serial Bus (USB) interface 545, and a communication network interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 585. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 4G, LTE, 1G, and so forth). The I/O processor 525 of FIG. 5 primarily controls data exchanges between the various devices of the entertainment system 500 including the CPU 510, the vector unit 515, the graphics processing unit 520, and the peripheral interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the communication network interface 550 such as wireless transceivers, which may also be embedded in the system 500 or as a part of some other component such as a processor.

A user of the entertainment system 500 of FIG. 5 provides instructions via the peripheral interface 535 to the CPU 510, which allows for use of a variety of different available peripheral devices (e.g., controllers) known in the art. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices.

Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method of providing interactive media streaming, the method comprising:
    monitoring a media stream associated with an interactive content title, the media stream depicting an activity that includes user interaction with one or more interactive objects during a gameplay session of the interactive content title, the media stream including object images of the interactive objects;
    recording a set of activity data that includes object data about the one or more interactive objects associated with the user interaction during a period of time of the depicted activity and one or more associated timestamps indicating one or more durations within the period of time during which the user interaction with each of the interactive objects occurs;
    detecting a timestamp associated with a user selection made at a user device associated with a user account during play of a portion of the media stream that includes one or more of the object images;
    retrieving a set of the object data from the recorded set of activity data based on the timestamp associated with the user selection, wherein the retrieved set of object data corresponds to the interactive objects depicted in the one or more object images included within the portion of the media stream; and
    generating a display for the user device, the generated display including a list of the object data corresponding to the one or more interactive objects, wherein the object data for each interactive object in the list includes recorded data regarding the associated user interaction.

2. The method of claim 1, wherein the media stream includes user-generated content.

3. The method of claim 1, wherein the set of activity data includes data regarding at least one of a result, activity information, an activity type, a number of users, and a duration.

4. The method of claim 1, wherein the media stream is linked to the interactive content title, and further comprising prompting a user to interact with the interactive content title linked to the media stream.

5. The method of claim 1, further comprising:
receiving an additional user selection of one of the one or more object images;
retrieving object metadata of the selected object image; and
providing an object corresponding to the user selection for interaction by the user account, the object provided within the stream of the interactive content title.

6. The method of claim 5, wherein the object metadata includes at least one of a type, a value, a source, and an ability.

7. The method of claim 5, wherein the object metadata includes an ownership ledger.

8. The method of claim 7, wherein the ownership ledger includes at least one unique owner identification identifying a previous or current owner.

9. The method of claim 5, further comprising:
receiving a user request to add the object metadata to the user account; and
adding the object metadata to the user account.

10. The method of claim 1, further comprising streaming the media stream on the user device.

11. The method of claim 1, wherein the set of activity data includes an activity identifier associated with a media identifier of the media stream.

12. The method of claim 1, wherein the set of activity data includes at least one timestamp corresponding to a point in time within the media stream.

13. The method of claim 12, further comprising matching the indicated timestamp to one of the at least one timestamp of the set of activity data, and wherein retrieving the associated object data for the one or more object images is based on the match.

14. The method of claim 1, wherein the set of activity data includes a result, an activity type, or a number of user associated with the activity.

15. A system for providing interactive media streaming, the system comprising:
memory that stores:
at least one media stream associated with an interactive content title, the at least one media stream depicting an activity based on user interaction during gameplay with the interactive content title, and
at least one set of activity data associated with the activity and including object data about one or more object images shown in the media stream during a period of time of the depicted activity and associated timestamps reflective of durations associated with the at least one set of activity data including the object data; and
one or more processors that executes instructions stored in the memory, wherein execution of the instructions by the one or more processors:
monitor the media stream associated with the interactive content title, the media stream depicting the activity that includes user interaction with one or more interactive objects during a gameplay session of the interactive content title, the media stream including object images of the interactive objects;
record a set of activity data that includes object data about the one or more interactive objects associated with the user interaction during a period of time of the depicted activity and one or more associated timestamps indicating one or more durations during which the user interaction with each of the interactive objects occurs;
detects a timestamp associated with a user selection made at a user device associated with a user account during play of a portion of the media stream that includes one or more object images;
retrieves a set of the object data from the recorded set of activity data based on the timestamp associated with the user selection, wherein the retrieved set of object data corresponds to the interactive objects depicted in the one or more object images included within the portion of the media stream; and
generates a display for the user device, the generated display including a list of the object data corresponding to the one or more interactive objects, wherein the object data for each interactive object in the list includes recorded data regarding the associated user interaction.

16. The system of claim 15, wherein further execution of the instructions by the one or more processors receives an additional user selection of one of the one or more object images and retrieves object metadata of an object image selected.

17. The system of claim 16, wherein the object metadata includes at least one of a type, a value, a source, and an ability.

18. The system of claim 17, wherein the object metadata includes an ownership ledger.

19. The system of claim 18, wherein the ownership ledger includes at least one unique owner identification identifying a previous or current owner.

20. The system of claim 16 wherein further execution of the instructions by the one or more processors:
receives a user request to add the object metadata to the user account, and
adds the object metadata to the user account.

21. The system of claim 15, wherein the media stream is published by a publisher of the interactive content title.

22. The system of claim 21, wherein the media stream is linked to the interactive content title, and wherein the media stream prompts interaction with the interactive content title linked to the media stream.

* * * * *